(12) United States Patent
Zurbach et al.

(10) Patent No.: US 10,641,253 B2
(45) Date of Patent: May 5, 2020

(54) DEVICE AND METHOD FOR REGULATING FLOW RATE

(71) Applicant: SAFRAN AIRCRAFT ENGINES, Paris (FR)

(72) Inventors: Stephan Zurbach, Vernon (FR); Julien Rabin, Saint Cyr l'Ecole (FR); Michael Oberg, Port Mort (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 201 days.

(21) Appl. No.: 15/560,864

(22) PCT Filed: Mar. 24, 2016

(86) PCT No.: PCT/FR2016/050648
§ 371 (c)(1),
(2) Date: Sep. 22, 2017

(87) PCT Pub. No.: WO2016/151251
PCT Pub. Date: Sep. 29, 2016

(65) Prior Publication Data
US 2018/0119682 A1 May 3, 2018

(30) Foreign Application Priority Data
Mar. 25, 2015 (FR) ..................... 15 52500

(51) Int. Cl.
*F03H 1/00* (2006.01)
*G05D 7/06* (2006.01)
*B64G 1/40* (2006.01)

(52) U.S. Cl.
CPC .......... *F03H 1/0012* (2013.01); *B64G 1/402* (2013.01); *G05D 7/0652* (2013.01); *G05D 7/0694* (2013.01); *B64G 1/405* (2013.01)

(58) Field of Classification Search
CPC . G05D 7/0652; F03H 1/00–0093; F03H 3/00; F03H 99/00; B64G 1/402
(Continued)

(56) References Cited

U.S. PATENT DOCUMENTS 6,279,314 B1 * 8/2001 Valentian .............. F03H 1/0075
60/202
6,334,301 B1 * 1/2002 Otsap ........................ F15C 5/00
137/833
(Continued)

FOREIGN PATENT DOCUMENTS

CN 2305537 Y 1/1999
CN 102187183 A 9/2011
(Continued)

OTHER PUBLICATIONS

Chinese Office Action dated May 28, 2019 in corresponding Chinese Patent Application No. 2016800246757, 7 pages.
(Continued)

*Primary Examiner* — Gerald L Sung
*Assistant Examiner* — William L Breazeal
(74) *Attorney, Agent, or Firm* — Oblon, McClelland, Maier & Neustadt, L.L.P.

(57) ABSTRACT

A flow rate regulator device is provided, including an upstream chamber, a downstream chamber, a plurality of electrically conductive capillary ducts providing parallel fluid flow connections between the upstream chamber and the downstream chamber, first and second electrical terminals configured to be connected to an electric current source, and at least one electric switch configured to connect one or more of the capillary ducts selectively between the electrical terminals. A system for feeding propellant gas to a space electric thruster is also provided, including at least one such flow rate regulator device to regulate a propellant gas flow (Continued)

rate. And, a flow rate regulation method is provided, using the flow rate regulator device.

10 Claims, 3 Drawing Sheets

(58) Field of Classification Search
USPC .................................. 204/451, 452, 545, 601
See application file for complete search history.

(56) References Cited

U.S. PATENT DOCUMENTS

| | | |
|---|---|---|
| 2002/0175247 A1 | 11/2002 | Zeender et al. |
| 2014/0090357 A1 | 4/2014 | Zurbach et al. |
| 2014/0208713 A1 | 7/2014 | Lorand |

FOREIGN PATENT DOCUMENTS

| | | |
|---|---|---|
| CN | 102341761 A | 2/2012 |
| CN | 102798831 A | 11/2012 |
| CN | 103149949 A | 6/2013 |
| CN | 103917779 A | 7/2014 |
| FR | 2 973 081 A1 | 9/2012 |
| JP | 2000-205115 A | 7/2000 |
| JP | 2000-249112 A | 9/2000 |
| JP | 2011-144699 A | 7/2011 |
| WO | 2013/034825 A1 | 3/2013 |

OTHER PUBLICATIONS

Combined Office Action and Search Report dated Nov. 27, 2018 in Chinese Patent Application No. 201680024675.7, 13 pages (with English translation and English translation of categories of cited documents).

International Search Report dated Jun. 8, 2016 in PCT/FR2016/050648 filed Mar. 24, 2016.

Japanese Office Action dated Nov. 26, 2019 in Patent Application No. 2017-550103 (with English translation), 7 pages.

\* cited by examiner

DEVICE AND METHOD FOR REGULATING FLOW RATE

BACKGROUND OF THE INVENTION

The present invention relates to the field of regulating fluid flow rate, and in particular regulating very small flow rates such as the rate at which propellant gas is fed to space electric thrusters.

One means known to the person skilled in the art for regulating such a flow rate is a device known as a "thermocapillary" device, i.e. an electrically conductive capillary duct suitable for being connected to a source of electric current. Such an electric current flowing in the capillary duct causes it to be heated by the Joule effect, which heating changes the head loss due to the capillary duct and thus changes the mass flow rate of fluid passing along the capillary duct for a determined feed pressure.

Nevertheless, a major drawback of known thermocapillary devices is that they enable the fluid flow rate to be varied over a very limited range only, in particular when the feed pressure is constant.

OBJECT AND SUMMARY OF THE INVENTION

The present disclosure seeks to remedy those drawbacks by proposing a flow rates regulator device that enables very small fluid flow rate to be regulated with great accuracy over ranges that are relatively large.

This object is achieved by the fact that the flow rate regulator device comprises an upstream chamber, a downstream chamber, a plurality of electrically conductive capillary ducts providing parallel fluid flow connections between the upstream chamber and the downstream chamber, first and second electrical terminals suitable for being connected to an electric current source, and at least one electric switch arranged so as to connect one or more of said capillary ducts selectively between the electrical terminals.

By arranging a plurality of capillary ducts in parallel and selectively activating individual ducts, it is possible to enlarge very significantly the range over which it is possible to regulate fluid flow rate compared with a system in which all of the flow passes along a single capillary duct suitable for being heated by the Joule effect.

In order to simplify regulating the current flowing between the two electrical terminals, and thus regulating the heating of the capillary ducts and the flow rate, said at least one electric switch may be arranged so as to connect one of said capillary ducts or a plurality of said capillary ducts in series selectively between the electrical terminals. In particular, in order to enlarge the range over which flow rate can be regulated, the flow rate regulator device may comprise at least three said capillary ducts and a plurality of electric switches arranged to select the number of said capillary ducts that are to be connected in series between the electrical terminals.

In order to obtain these results with an electric circuit that is particularly simple, the flow rate regulator device may include at least one electric switch connected to one of said capillary ducts and suitable for being switched between an electrical connection to another one of said capillary ducts and an electrical connection to one of said electrical terminals. In particular, a first end of a first capillary duct may be connected to the first electrical terminal, a first end of a second capillary duct may be connected to the second electrical terminal, and an electric switch connected to a second end of the first capillary duct may be suitable for being switched between an electrical connection to the second electrical terminal and an electrical connection to a second end of the second capillary duct. Thus, switching this electric switch makes it possible to insert or to exclude the second electrical duct from the electric circuit formed between the two terminals.

The flow rate regulator device of the present disclosure is particularly useful for regulating very small flow rates of gas in accurate and reliable manner in environments that are particularly difficult. Thus, the present disclosure also relates in particular to a system for feeding propellant gas, such as xenon for example, in a space electric thruster, such as a Hall effect thruster for example, and including at least one such flow rate regulator device for regulating a flow rate of said propellant gas, and it also relates to a space electric thruster including such a propellant gas feed system.

The present disclosure also relates to a method of regulating fluid flow rate between an upstream chamber and a downstream chamber, wherein at least one electric switch selectively connects between two electrical terminals one or more capillary ducts from a plurality of electrically conductive capillary ducts providing fluid flow connections in parallel between the upstream chamber and the downstream chamber in order to use the Joule effect to heat the capillary ducts as electrically connected in this way between the two electrical terminals, in order to regulate a fluid flow rate passing via the plurality of capillary ducts from the upstream chamber to the downstream chamber. A plurality of said capillary ducts may thus be electrically connected in series between the two electrical terminals in order to regulate the fluid flow rate. The current flowing between the two electrical terminals is also regulated in order to regulate the flow rate of fluid passing via the plurality of capillary ducts.

BRIEF DESCRIPTION OF THE DRAWINGS

The invention can be well understood and its advantages appear better on reading the following detailed description of an embodiment shown by way of non-limiting example. The description refers to the accompanying drawings, in which.

DETAILED DESCRIPTION OF THE INVENTION

Figure 1:
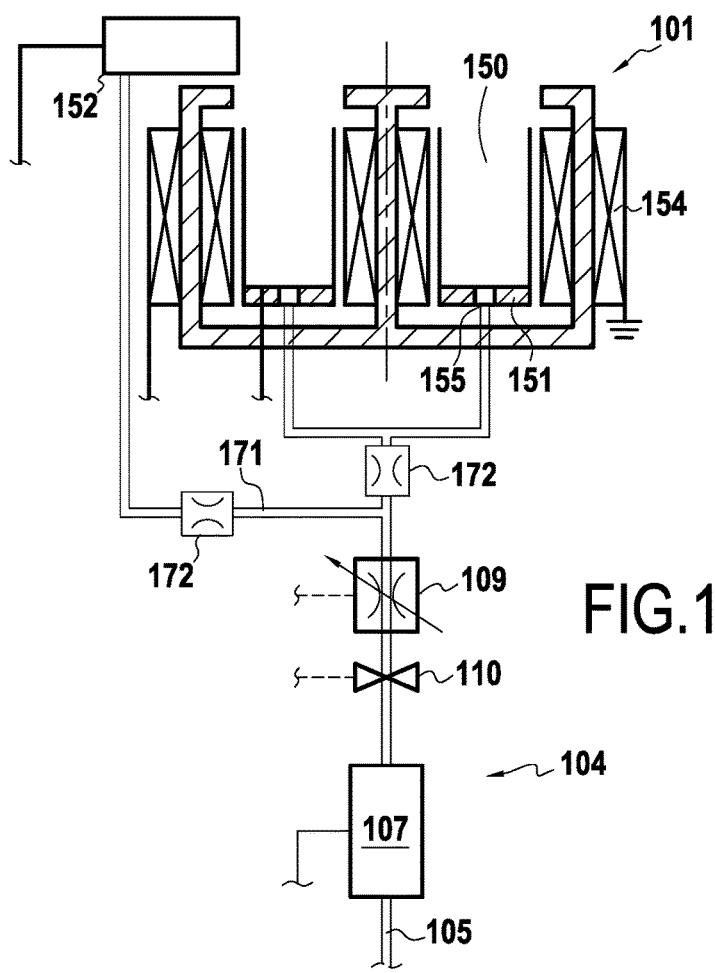
FIG. 1 is a diagram of an example of an electric space thruster.

FIG. 1 shows an electric space thruster 101. The thruster 101, which is more specifically a Hall effect electrostatic thruster, comprises a channel 150 of annular section that is closed at its upstream end and open at its downstream, an anode 151 situated at the upstream end of the channel 150, an emitter cathode 152 situated downstream from the downstream end of the channel 150 and fitted with at least one heater element 153, electromagnets 154 situated radially inside and outside the channel 150, and propellant fluid injectors 155 situated at the upstream end of the channel 150. Such a thruster 101 is particularly applicable to controlling the trajectory and orientation of a space vehicle, such as a satellite, a probe, or a top stage of a launcher. It serves to obtain very high specific impulses (of the order of 1500 seconds (s) to 2000 s) and thus consumes very little propellant gas. Nevertheless, the maximum thrust of such a thruster is at present quite limited.

As can be seen in FIG. 1, the thruster 101 also has a propellant fluid feed system 104 (e.g. for feeding xenon) with a feed line 105 for feeding the electrostatic thruster 101 with propellant gas that is connected to the injectors 155 of the electrostatic thruster 101. The line 105 has installed thereon a regulator 107 for regulating the pressure at which the electrostatic thruster 101 is fed with propellant gas. This pressure regulator 107 thus serves to ensure pressures that are substantially constant for feeding two thrusters even when the upstream feed pressure varies strongly.

An on/off valve 110 and a flow rate regulator device 109 are also installed in series on the propellant gas feed line 105 of the electrostatic thruster 101, downstream from the pressure regulator 107 but still upstream from the injectors 155 for injecting propellant fluid into the electrostatic thruster 101. The on/off valve 110 serves to control the feed of propellant gas to the electrostatic thruster, while the flow rate regulator device 109 serves to regulate its flow rate. Furthermore, the propellant fluid feed circuit 104 also includes a branch connection 171 connecting the line 105 downstream from the flow rate regulator 109 to the cathode 152 in order to deliver a very small flow rate of gas to the cathode 152, which is a hollow cathode, so as to facilitate the emission of electrons from the cathode 152, and also so as to cool it. Constrictions 172 in the branch connection 171 and upstream from the injectors 155 restrict the rate at which propellant gas is supplied to the cathode 152 relative to the rate at which it is injected through the injectors 155.

The flow rate regulator device 109 should normally be suitable for regulating the propellant gas feed to a mass flow rate that is very low, of the order of a few milligrams per second (mg/s). For this purpose, the person skilled in the art normally makes use of flow rate regulator devices of the so-called "thermocapillary" or "thermorestrictor" type in which the gas passes through a capillary duct connected to a current source in order to regulate the gas flow rate by heating the capillary duct by the Joule effect. Nevertheless, in practice, such flow rate regulator devices of the prior art enable flow rate to be regulated only over ranges that are quite narrow, particularly when the feed pressure is constant. Thus, the flow rate regulator used in the PPS® 1350 Hall effect thruster with a xenon feed pressure of 265 kilopascals (kPa) can vary the flow rate over a range of only 4 mg/s to 8 mg/s. Although that range is sufficient for that existing Hall effect thruster, which is optimized for a single operating point at a power of 1.5 kilowatts (kW) and a voltage of 350 volts (V) between the anode and the cathode, it is clearly insufficient for electrostatic thrusters intended for operation over large power and thrust ranges, and thus requiring propellant gas flow rates to be regulated over ranges of 10 mg/s to 17 mg/s or even 17 mg/s to 50 mg/s, for example.

In order to satisfy this need, the flow rate regulator device 109 in one embodiment, and as shown in detail in FIGS. 2A to 2E, comprises five capillary ducts 201 to 205 providing parallel fluid flow connections between an upstream chamber 206 and a downstream chamber 207. The upstream chamber 206 is to receive the propellant gas coming from a propellant gas source via the feed line 105, downstream from the pressure regulator 107 and the on/off valve 110, while the downstream chamber 207 is for being connected upstream from the injectors 155 in order to feed them with propellant gas at regulated flow rate and pressure.

The capillary ducts 201 to 205 are also electrically conductive, and the flow rate regulator device 109 also includes a first electrical terminal 208 connected to a first end 201a of the capillary duct 201 adjacent to the upstream chamber 206, a second electrical terminal 209 connected to a second end 205b of the capillary duct 205 adjacent to the downstream chamber 207, and to electric circuits 210 and 211 that are situated respectively on the upstream and downstream chambers 206 and 207. Insulating fittings 220 may be interposed between the ends of the capillary ducts 201 to 205 and the upstream and downstream chambers 206 and 207 in order to insulate these ends from the circuits 210 and 211 and from one another. The electrical terminals 208 and 209 may be connected to an electric current source, and in particular to a variable electric current source.

The circuit 210 has two switches 210a and 210b, and the circuit 211 has two other switches 211a and 211b. The switch 210a is connected to the end 202a of the capillary duct 202, and it is configured so as to be capable of switching between a connection to the end 203a of the capillary duct 203 and a connection to the second electrical terminal 209. Similarly, the switch 210b is connected to the end 204a of the capillary duct 204 and is configured so as to be capable of switching between a connection to the end 205a of the capillary duct 205 and a connection to the second electrical terminal 209. In the circuit 211, the switch 211a is connected to the end 201b of the capillary duct 201 and is configured so as to be capable of switching between a connection to the end 202b of the capillary duct 202 and a connection to the second electrical terminal 209. Similarly, the switch 211b is connected to the end 203b of the capillary duct 203 and is configured so as to be capable of switching between a connection to the end 204a of the capillary duct 204 and a connection to the second electrical terminal 209.

The switches 210a, 210b and 211a, 211b thus make it possible to select a number of capillary ducts from among the five capillary ducts 201 to 205 for being electrically connected in series between the first and second electrical terminals 208 and 209. Thus, in the configuration shown in FIG. 2A, the switch 211a connects the end 201b of the capillary duct 201 to the second electrical terminal 209. In this way, and independently of the positions of the other switches, only the capillary duct 201 is connected between the two electrical terminals 208 and 209, so an electric current flowing between the two terminals 208 and 209 flows only through this capillary duct 201 from the set of capillary ducts 201 to 205, thereby heating this capillary duct 201 in order to regulate the gas flow rate. In contrast, in the configuration shown in FIG. 2B, the switch 211a connects the end 201b of the capillary duct 201 to the adjacent end 202b of the capillary duct 202. The switch 210a connects the other end 202a of the capillary duct 202 to the second terminal 209 in such a manner that independently of the positions of the remaining switches, only the capillary ducts 201 and 202 are connected in series between the first and second electrical terminals 208 and 209, and an electric current flowing between these two terminals 208 and 209 flows only along these capillary ducts 201 and 202 from among the set of capillary ducts 201 to 205, thereby heating these capillary ducts 201 and 202 in order to regulate the gas flow rate.

Figure 2A:
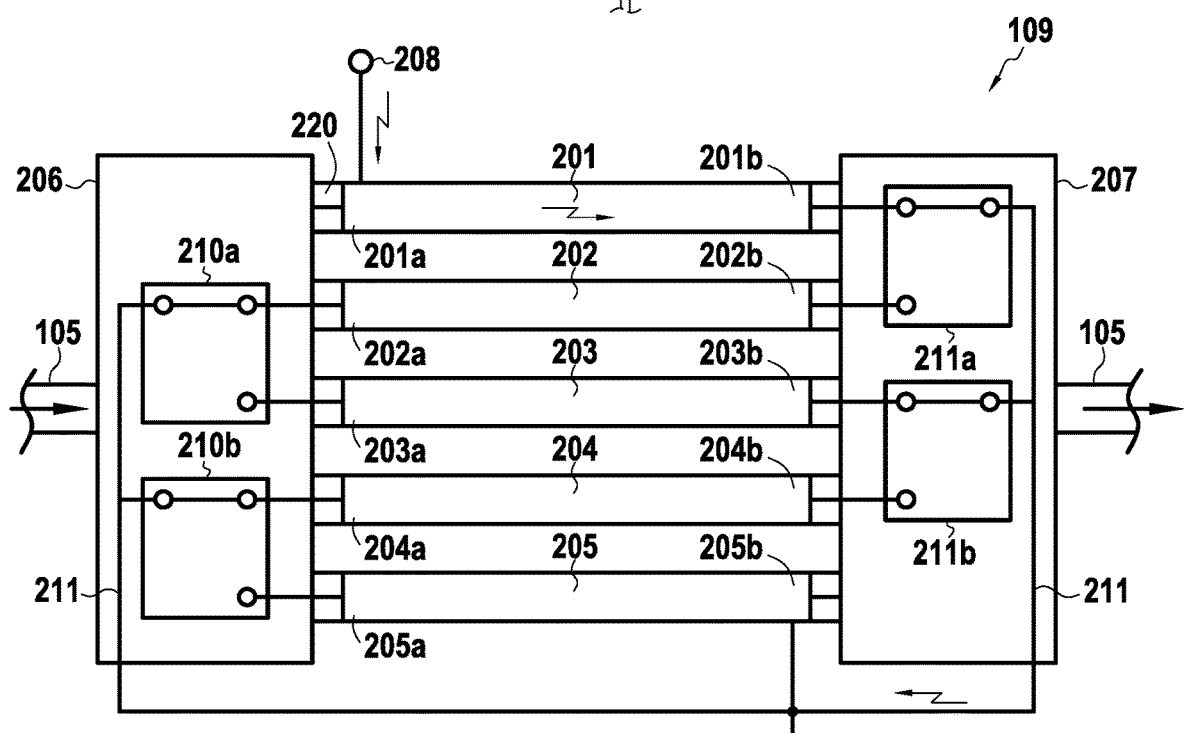
FIGS. 2A to 2E are diagrams showing an embodiment of a flow rate regulator device in five different modes of operation.
Figure 2B:
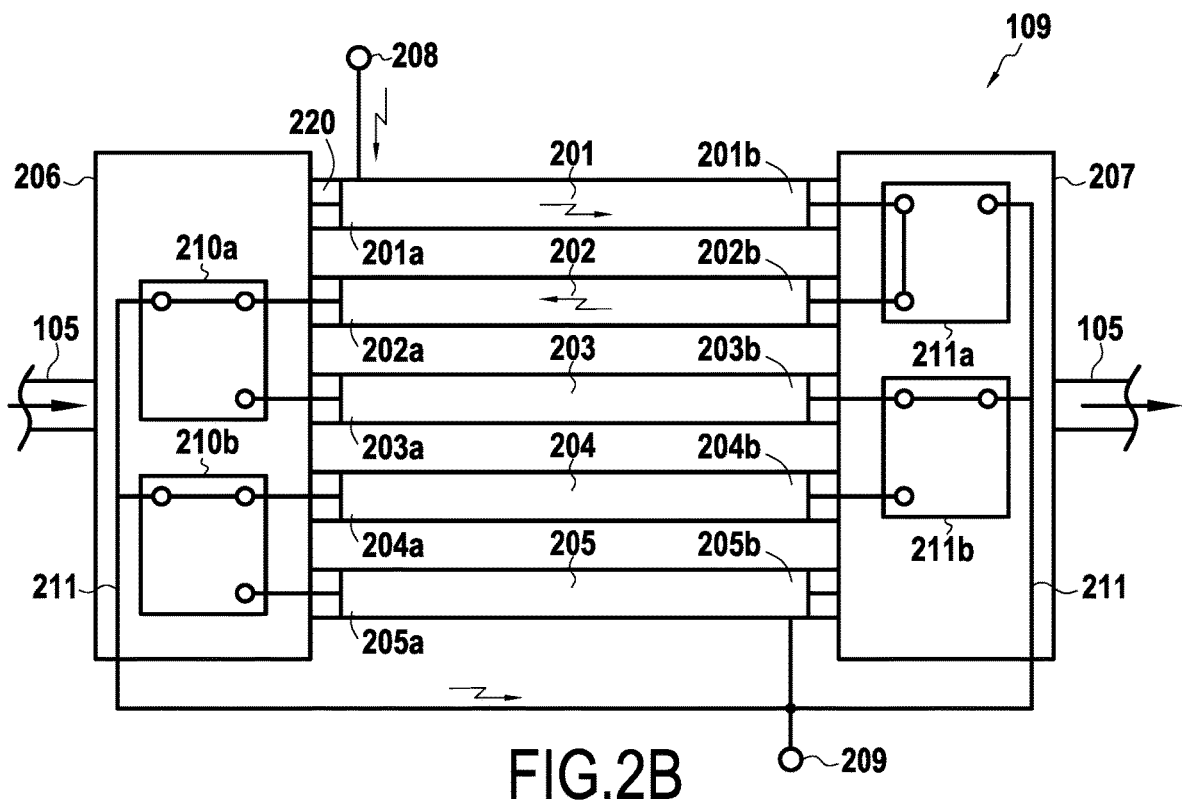
Figure 2C:
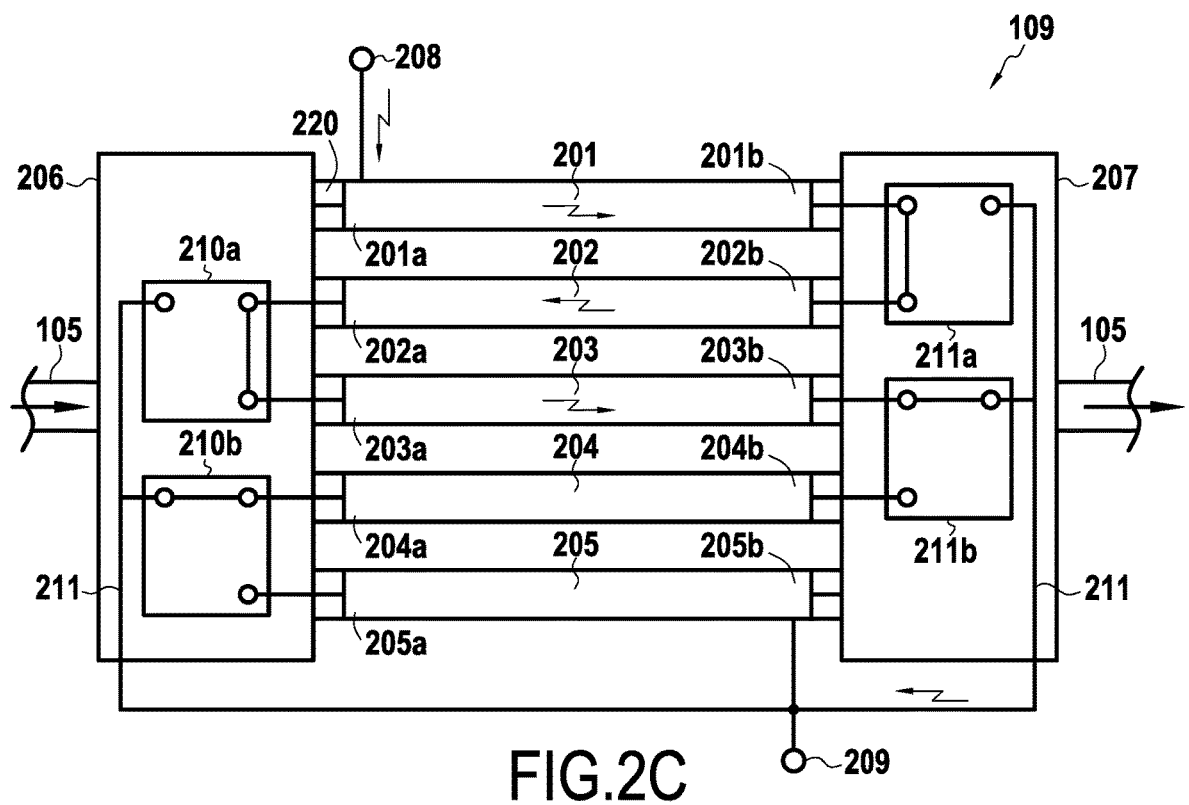

In the configuration shown in FIG. 2C, the switch 211a connects the end 201b of the capillary duct 201 to the adjacent end 202b of the capillary duct 202, while the switch 210a connects the other end 202a of the capillary duct 202 to the adjacent end 203a of the capillary duct 203, thereby connecting the three capillary ducts 201, 202, and 203 in series. Furthermore, the switch 211b connects the end 203b of the capillary duct 203 to the second electrical terminal 209 in such a manner that independently of the position of the switch 210b, only the capillary ducts 201, 202, and 203 are connected in series between the first and second electrical terminals 208 and 209, and an electric current flowing between these two terminals 208 and 209 flows only via these capillary ducts 201, 202, and 203 from among the set of capillary ducts 201 to 205, thereby heating the capillary ducts 201, 202, and 203 in order to regulate the gas flow rate.

Figure 2D:
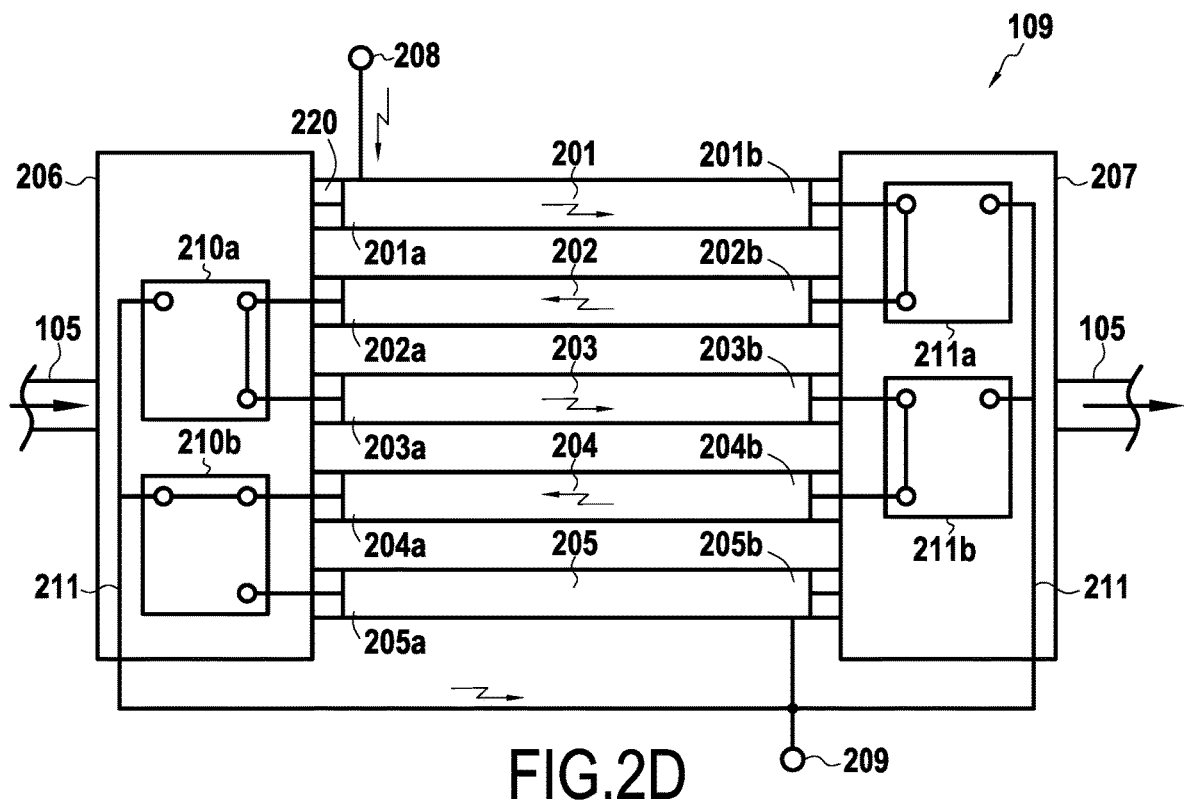

In the configuration shown in FIG. 2D, the switch 211a connects the end 201b of the capillary duct 201 to the adjacent end 202b of the capillary duct 202, the switch 210a connects the other end 202a of the capillary duct 202 to the adjacent end 203a to the capillary duct 203, and the switch 211b connects the other end 203b of the capillary duct 203 to the adjacent end 204b of the capillary duct 204, thereby connecting the four capillary ducts 201 to 204 in series. Furthermore, the switch 210b connects the end 204a of the capillary duct 204 to the second electrical terminal 209, in such a manner that only the capillary ducts 201, 202, 203, and 204 are connected in series between the first and second electrical terminals 208 and 209, and an electric current flowing between these two terminals 208 and 209 flows solely via these capillary ducts 201, 202, 203, and 204 from the set of capillary ducts 201 to 205, thereby heating these capillary ducts 201, 202, 203, and 204 in order to regulate the gas flow rate.

Figure 2E:
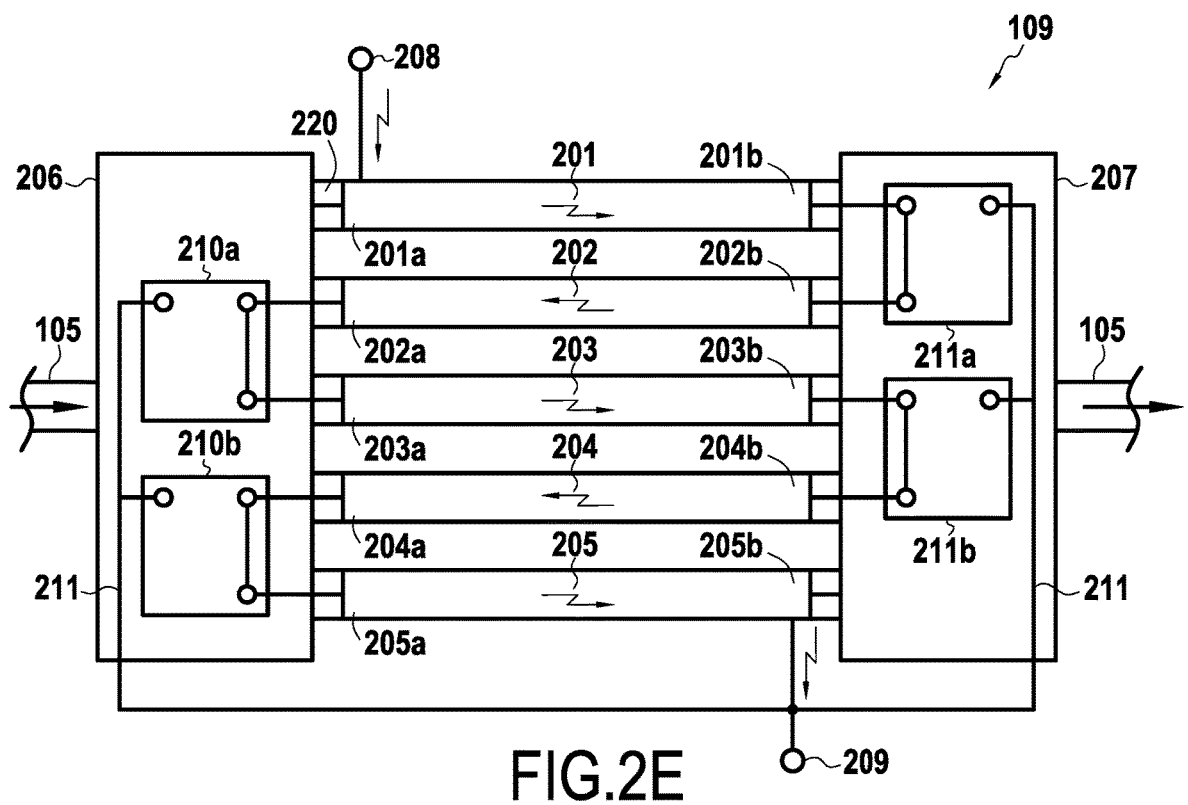

Finally, in the configuration shown in FIG. 2E, the switch 211a connects the end 201b of the capillary duct 201 to the adjacent end 202b of the capillary duct 202, the switch 210a connects the other end 202a of the capillary duct 202 to the adjacent end 203a of the capillary duct 203, the switch 211b connects the other end 203b of the capillary duct 203 to the adjacent end 204b of the capillary duct 204, and the switch 210a connects the other end 204a of the capillary duct 204 to the adjacent end 205a of the capillary duct 205, thereby connecting the five capillary ducts 201 to 205 in series in such a manner that an electric current flowing between these two terminals 208 and 209 flows via the five capillary ducts 201 to 205, heating all of these capillary ducts 201 to 205 in order to regulate the gas flow rate.

Thus, by using the switches 210a, 210b, 211a, and 211b to connect one or more capillary ducts selectively between the two electrical terminals 208 and 209, which capillary ducts are selected from among the five capillary ducts 201 to 205 providing parallel fluid connections between the upstream chamber and the downstream chamber, it is possible to use the Joule effect to heat the capillary duct(s) as selected in this way in order to regulate, by means of the number of capillary ducts that are heated, the flow rate of gas flowing from the upstream chamber 206 to the downstream chamber 207 through the set of capillary ducts 201. Regulating the electric current flowing between the two electrical terminals 208 and 209 can also contribute to regulating the gas flow rate accurately.

Thus, a flow rate regulator device as shown, having five capillary ducts, each equivalent to the duct used for the PPS® 1350 thruster and fed with xenon gas at 256 kPa, and using an electric current regulated over a range 0.5 amps (A) to 3 A, makes it possible to regulate the flow rate of the gas over the range 78 mg/s to 68 mg/s in the configuration shown in FIG. 2A, over the range 75 mg/s to 55 mg/s in the configuration shown in FIG. 2B, over the range 71 mg/s to 43 mg/s in the configuration shown in FIG. 2C, over the range 68 mg/s to 30 mg/s in the configuration shown in FIG. 2D, and over the range 64 mg/s to 17 mg/s in the configuration shown in FIG. 2E, thus achieving an overall regulation range of 17 mg/g to 78 mg/s.

Although the present invention is described with reference to a specific embodiment, it is clear that various modifications and changes may be undertaken on this example without going beyond the general ambit of the invention as defined by the claims. For example, the number of capillary ducts may be less than or greater than five. In addition, the arrangement of the switches may vary so long as it makes it possible to feed electricity selectively to one or more subsets of capillary ducts from among all of them. Consequently, the description and the drawings should be considered in a sense that is illustrative rather than restrictive.

The invention claimed is:

1. A flow rate regulator device, comprising:
an upstream chamber;
a downstream chamber;
a plurality of electrically conductive capillary ducts providing parallel fluid flow connections between the upstream chamber and the downstream chamber;
first and second electrical terminals configured to be connected to an electric current source; and
at least one electric switch configured to selectively connect one electrically conductive capillary duct of the plurality of electrically conductive capillary ducts or multiple electrically conductive capillary ducts of the plurality of said capillary ducts, in series, between the first and the second electrical terminals.

2. The flow rate regulator device according to claim 1, wherein the plurality of electrically conductive capillary duct comprises at least three electrically conductive capillary ducts, and
wherein the flow rate regulator device further comprises a plurality of electric switches configured to select a number of the plurality of electrically conductive capillary ducts to be connected in series between the first and second electrical terminals.

3. A flow rate regulator device, comprising:
an upstream chamber:
a downstream chamber:
a plurality of electrically conductive capillary ducts providing parallel fluid flow connections between the upstream chamber and the downstream chamber:
first and second electrical terminals configured to be connected to an electric current source: and
at least one electric switch connected to one of the plurality of electrically conductive capillary ducts and configured to be switched between a first electrical connection to another one of the plurality of electrically conductive capillary ducts and a second electrical connection to one of the first and the second electrical terminals.

4. The flow rate regulator device according to claim 3, wherein a first end of a first electrically conductive capillary duct of the plurality of electrically conductive capillary ducts is connected to the first electrical terminal, a first end of a second electrically conductive capillary duct of the plurality of electrically conductive capillary ducts is connected to the second electrical terminal, and an electric switch connected to a second end of the first capillary duct is configured to be switched between a third electrical connection to the second electrical terminal and a fourth electrical connection to a second end of the second electrically conductive capillary duct.

5. A system for feeding propellant gas to a space electric thruster, the system comprising the flow rate regulator device according to claim 1, for regulating a flow rate of the propellant gas.

6. A space electric thruster including a system according to claim 5, for feeding the propellant gas to the space electric thruster.

7. A method of regulating a fluid flow rate between an upstream chamber and a downstream chamber, the method comprising:

at least one electric switch selectively connecting, between two electrical terminals, one electrically conductive capillary duct from a plurality of electrically conductive capillary ducts or multiple electrically conductive capillary ducts of the plurality of electrically conductive capillary ducts, in series; and by the selectively connecting, providing fluid flow connections in parallel between the upstream chamber and the downstream chamber in order to use a Joule effect to heat the one electrically conductive capillary duct or the multiple electrically conductive capillary ducts electrically connected in series between the two electrical terminals to regulate the fluid flow rate passing via the plurality of electrically conductive capillary ducts from the upstream chamber to the downstream chamber.

8. The method of regulating fluid flow rate according to claim 7, wherein an electric current flowing between the two electrical terminals is also regulated in order to regulate the fluid flow rate passing via the plurality of electrically conductive capillary ducts.

9. A system for feeding propellant gas to a space electric thruster, the system comprising the flow rate regulator device according to claim 3, for regulating a flow rate of the propellant gas.

10. A space electric thruster including a system according to claim 9, for feeding the propellant gas to the space electric thruster.

* * * * *